United States Patent Office 3,418,331
Patented Dec. 24, 1968

3,418,331
2-(2,6-DIHALOPHENYL)-4-HYDROXY-THIAZOLE-5-ACETIC ACID AND DERIVATIVES THEREOF
John Yates and Ernest Haddock, Kent, England, assignors to Shell Oil Company, New York, N.Y., a corporation of Delaware
No Drawing. Filed Dec. 29, 1965, Ser. No. 517,457
7 Claims. (Cl. 260—302)

This invention relates to novel herbicidal compounds, compositions containing them, and their use as herbicides. More particularly, the invention relates to novel derivatives of 2,6-dihalothiobenzamides. Specifically, it relates to 2 - (2,6 - dihalophenyl) - 4 - hydroxy - 5 - carboxymethylthiazoles and esters and salts thereof.

The compounds of the present invention are those represented by the formula:

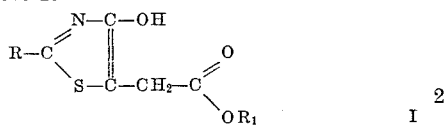

wherein R represents a 2,6-dihalophenyl group, and $R_1$ represents a hydrogen atom or an alkyl group containing 1 to 10 carbon atoms; and salts thereof. The group R preferably represents a 2,6-dichlorophenyl group. The said salts may be derived from organic or inorganic acids, for example, hydrohalic acids, particularly hydrochloric or hydrobromic acid, or sulfuric, nitric, phosphoric, acetic, glycollic, lactic, succinic, citric, salicylic, methanesulfonic, ethanesulfonic, benzenesulfonic, or p-toluenesulfonic acid, or from monoalkyl esters of sulfuric acid, for example, the mono-methyl ester of sulfuric acid.

Specific examples of the compounds of the invention are:

2-(2,6-dichlorophenyl)-4-hydroxy-5-carboxymethylthiazole
2-(2,6-dichlorophenyl)-4-hydroxy-5-methoxycarbonylmethylthiazole, and its hydrochloride
2-(2,6-dichlorophenyl)-4-hydroxy-5-ethoxycarbonylmethylthiazole, and its hydrochloride
2-(2,6-dichlorophenyl)-4-hydroxy-5-isopropoxycarbonylmethylthiazole, and its hydrochloride
2-(2,6-dichlorophenyl)-4-hydroxy-5-sec.butoxycarbonylmethylthiazole, and its hydrochloride
2-(2,6-dichlorophenyl)-4-hydroxy-5-(1-methylheptoxycarbonylmethyl)thiazole, and its hydrochloride
2-(2,6-dichlorophenyl)-4-hydroxy-5-(3,5,5-trimethylhexoxycarbonylmethyl)thiazole, and its hydrochloride
2-(2,6-dibromophenyl)-4-hydroxy-5-carboxymethylthiazole
2-(2,6-difluorophenyl)-4-hydroxy-5-carboxymethylthiazole
2-(2,6-diiodophenyl)-4-hydroxy-5-carboxymethylthiazole
2-(2,6-dichlorophenyl)-4-hydroxy-5-methoxycarbonylmethylthiazole, and its hydrobromide
2-(2,6-dichlorophenyl)-4-hydroxy-5-methoxycarbonylmethylthiazole, and its hydrofluoride Preferred because of their outstanding herbicidal properties is the subclass represented by the formula:

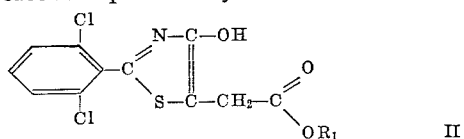

wherein $R_1$ represents hydrogen or alkyl of 1 to 10 carbon atoms and hydrochloride salts thereof. Exemplary of such compounds are:

2-(2,6-dichlorophenyl)-4-hydroxy-5-carboxymethylthiazole 2-(2,6-dichlorophenyl)-4-hydroxy-5-methoxycarbonylmethylthiazole, and its hydrochloride
2-(2,6-dichlorophenyl)-4-hydroxy-5-ethoxycarbonylmethylthiazole, and its hydrochloride
2-(2,6-dichlorophenyl)-4-hydroxy-5-isopropoxycarbonylmethylthiazole, and its hydrochloride
2-(2,6-dichlorophenyl)-4-hydroxy-5-sec.butoxycarbonylmethylthiazole, and its hydrochloride The compounds of Formula I wherein $R_1$ represents a hydrogen atom can be prepared by a process comprising reacting a 2,6-dihalothiobenzamide with maleic acid, maleic anhydride or 2-bromosuccinic acid. This reaction is preferably carried out in a liquid reaction medium. Suitable reaction media are, for example, aliphatic carboxylic acids containing up to 4 carbon atoms such as, for example, acetic acid and propionic acid; alcohols containing up to 8 carbon atoms; ketones such as, for example, acetone and methyl isobutyl ketone; hydrocarbon solvents such as, for example, benzene, toluene, and the xylenes; dimethyl formamide; and dimethyl sulfoxide; acetic acid being particularly preferred. The reaction is preferably carried out at a temperature between 50 and 200° C., most preferably between 90 and 120° C. Preferably substantially equimolar amounts of the reactants are used. For example, 2-(2,6-dichlorophenyl)-4-hydroxy-5-carboxymethylthiazole is obtained in high yield by refluxing substantially equimolar amounts of 2,6-dichlorothiobenzamide with maleic acid, maleic anhydride or 2-bromosuccinic acid in acetic acid, cooling the reaction mixture, and filtering off the separated product.

The compounds of Formula I wherein $R_1$ represents an alkyl group containing 1 to 10 carbon atoms can be prepared by esterifying a 2-(2,6-dihalophenyl)-4-hydroxy-5-carboxymethylthiazole with the appropriate alkanol in the presence of an acid esterification catalyst. Any conventional acid esterification catalyst may be used for this purpose, for example, sulfuric acid, p-toluenesulfonic acid, boric acid or hydrochloric acid. The esterification reaction may be carried out in the presence of an inert solvent, preferably a solvent capable of forming an azeotrope with water such as, for example, benzene or toluene, so that water formed in the reaction may continuously be removed by azeotropic distillation. A preferred process involves passing dry HCl gas through a mixture of a 2-(2,6-dihalophenyl)-4-hydroxy-5-carboxymethylthiazole and a molar excess of the desired alkanol at a temperature between 0 and 100° C. The product, in the form of its hydrochloric acid salt, generally separates from the reaction mixture. In some cases it will be necessary to distill off the excess alkanol wholly or partly in order to promote separation. The hydrochloric acid salts may be converted into the corresponding free bases by treatment with alkali, for example, by stirring the salt with an aqueous solution of sodium acetate. Alternatively, in many cases the free base may be precipitated directly from the esterification mixture by diluting it with water.

The compounds of the invention possess good herbicidal activity, being especially toxic to seeds. Compounds having Formula I wherein $R_1$ represents a hydrogen atom or a lower alkyl group, for example a methyl or ethyl group, are suitable as total weed killers, whereas compounds having Formula I wherein $R_1$ represents a higher alkyl group, for example an alkyl group containing 8 or 9 carbon atoms, have more selective herbicidal properties.

The compounds may be applied for herbicidal purposes in any conventional manner. Generally, they are used in the form of compositions. The invention therefore also relates to compositions suitable for eradicating or controlling weeds comprising as active ingredient one or more of the compounds specified above. These compositions may contain the active ingredient together with a carrier or a surface-active agent, or with a carrier and a surface-active agent.

The thiazole herbicidal compounds of the invention may be added to the carrier in amounts approximating 1% by weight of the total composition or may be employed in amounts as high as 80% by weight of the total composition. Solid formulations, encompassing dusts, granules or the like usually are prepared containing 1, 2, 5 or 10 percent by weight of the active ingredient based upon the weight of the total composition. Wettable powders may be conveniently formulated with approximately 25 to 80 percent by weight of the active ingredient. Liquid preparations contain approximately 25 to 50 percent of the active ingredient by weight to the weight of total liquid formulation.

The term "carrier" as used herein means a material, which may be inorganic or organic and synthetic or of natural origin, with which the active compound is mixed or formulated to facilitate its application to the plant, seed, soil or other object to be treated, or its storage, transport or handling. The carrier may be a solid or a fluid. Any of the materials usually applied in formulating herbicides may be used as carrier.

Examples of suitable solid carriers are silicates, clays, for example, kaolinite clay, synthetic hydrated silicon oxides, synthetic calcium silicates, elements such as, for example, carbon and sulfur, natural and synthetic resins. Examples of suitable fluid carriers are water, alcohols such as, for example, isopropanol, ketones such as, for example, acetone, methyl ethyl ketone, methyl isobutyl ketone and cyclohexanone, ethers, aromatic hydrocarbons such as, for example, benzene, xylene and toluene, petroleum fractions such as, for example, kerosine, chlorinated hydrocarbons such as, for example, carbon tetrachloride, including liquified normally vaporous or gaseous organic compounds. Mixtures of different liquids are often suitable.

The surface-active agent may be a wetting agent, an emulsifying agent or a dispersing agent; it may be non-ionic or ionic. Any of the surface-active agents usually applied in formulating herbicides may be used.

The compositions of the invention may contain other ingredients, for example, protective colloids such as gelatin, glue, casein, gums and polyvinyl alcohol; sodium polyphosphates; cellulose ethers; stabilizers such as ethylene diamine tetraacetic acid; other herbicides or pesticides; and stickers, for example non-volatile oils.

According to another aspect of the invention a method of controlling or eradicating weeds, from areas, particularly crop areas bearing or intended to bear crops, comprises applying to said areas a herbicidal compound or composition of the invention. Accordingly, a method for improving crop yields, which comprises applying a compound or a composition of the invention to a crop area before or after crop planting, or before or after crop emergence, also comes within the scope of the invention.

The invention in all its aspects is further illustrated in the examples that follow.

Example I.—Preparation of 2-(2,6-dichlorophenyl)-4-hydroxy-5-carboxymethylthiazole (a) 20.6 grams of 2,6-dichlorothiobenzamide and 10 grams of maleic anhydride were refluxed in 100 ml. of glacial acetic acid for 20 hours. After cooling, the solid product which had gradually separated from the reaction mixture was filtered off. Yield 23 g., melting point 253–255° C.

*Analysis.*—Calculated for $C_{11}H_7Cl_2NO_3S$ percent: C, 4.6; S, 10.5; Cl 23.3. Found: N, 4.7; S, 10.6; Cl, 23.0.

(b) A mixture of 20.6 g. of 2,6-dichlorothiobenzamide and 11.6 g. of maleic acid was refluxed in 200 ml. of glacial acetic acid for 20 hours. After cooling, the solid product which had separated from the reaction mixture was filtered off. Yield 18 g., melting point 254–256° C. The compound was identical with that described under I(a).

(c) A mixture of 20.6 g. of 2,6-dichlorothiobenzamide and 19.7 g. of 2-bromosuccinic acid was refluxed in 200 ml. of glacial acetic acid for 20 hours during which time hydrogen bromide was evolved. After cooling, the solid product which had separated from the reaction mixture was filtered off. Yield 28 g., melting point 256° C. The compound was identical with that described under I(a).

Example II.—Preparation of 2-(2,6-dichlorophenyl)-4-hydroxy-5-methoxycarbonylmethylthiazole Dry HCl gas was passed through a stirred mixture of 20 g. of 2 - (2,6-dichlorophenyl)-4-hydroxy-5-carboxymethylthiazole and 200 ml. of methanol for 2.5 hours. The reaction mixture was poured into water and the precipitated product filtered off; yield 20 g. Melting point after recrystallization from methanol 214–216° C.

*Analysis.*—Calculated for $C_{12}H_9Cl_2NO_3S$ percent: C, 45.3; H, 2.8; N, 4.4; S, 10.1; Cl, 22.3. Found: C, 45.4; H, 3.0; N, 4.3; S, 10.2; Cl, 22.2.

Example III.—Preparation of 2-(2,6-dichlorophenyl)-4-hydroxy-5-methoxycarbonylmethylthiazole hydrochloride A mixture of 31 g. of 2-(2,6-dichlorophenyl)-4-hydroxy-5-carboxymethylthiazole and 300 ml. of methanol was stirred and refluxed for 2 hours with passage of dry HCl gas through the mixture. The solid product which crystallized on cooling was filtered off and washed with methanol and ether. Yield 30 g., melting point 215–217° C.

*Analysis.*—Calculated for $C_{12}H_{10}Cl_3NO_3S$ percent: C, 40.6; H, 2.8; N, 3.9; S, 9.0; Cl, 30.0; Cl⁻, 10.0. Found: C, 40.6; H, 2.8; N, 4.1; S, 8.9; Cl, 29.9; Cl⁻, 9.9.

Example IV.—Preparation of 2-(2,6-dichlorophenyl-4-hydroxy-5-ethoxycarbonylmethylthiazole Dry HCl gas was passed through a stirred mixture of 500 g. of 2-(2,6-dichlorophenyl)-4-hydroxy-5-carboxymethylthiazole and 2000 ml. of ethanol for 6 hours. The reaction mixture was then poured into water, and the precipitated product was filtered off and crystallized from ethanol. Yield 450 g., melting point 207–209° C.

*Analysis.*—Calculated for $C_{13}H_{11}Cl_2NO_3S$ percent: C, 47.0; H, 3.3; N, 4.2; S, 9.6; Cl, 21.4. Found: C, 46.9; H, 3.2; N, 4.3; S, 9.8; Cl, 21.4.

Example V.—Preparation of 2-(2,6-dichlorophenyl)-4-hydoxy-5-isopropoxycarbonylmethylthiazole A mixture of 700 g. of 2-(2,6-dichlorophenyl)-4-hydroxy-5-carboxymethylthiazole and 3 liters of isopropanol was stirred and refluxed for 4 hours with passage of dry HCl gas through the mixture. It was then poured into 3 liters of water, the solid precipitate was filtered off, and washed with isopropanol and ether. Yield 550 g., melting point 192–193° C.

*Analysis.*—Calculated for $C_{14}H_{13}Cl_2NO_3S$ percent: C, 48.6; H, 3.8; N, 4.0; S, 9.2; Cl, 20.5. Found: C, 49.1; H, 4.0; N, 3.9; S, 9.7; Cl, 20.9.

Example VI.—Preparation of 2-(2,6-dichlorophenyl)-4-hydroxy - 5 - isopropoxycarbonylmethylthiazole hydrochloride Dry HCl gas was passed through a stirred mixture of 700 g. of 2-(2,6-dichlorophenyl)-4-hydroxy-5-carboxymethylthiazole and 3 liters of isopropanol for 2 hours. After distilling of 2 liters of isopropanol the product crystallized out. It was filtered off and washed with isopropanol and ether. Yield 610 g., melting point 200–203° C.

*Analysis.*—Calculated for $C_{14}H_{14}Cl_3NO_3S$ percent: C, 43.9; H, 3.7; N, 3.7; S, 8.4; Cl, 27.8; Cl⁻, 9.3. Found: C, 43.7; H, 3.5; N, 3.9; S, 8.4; Cl, 28.2; Cl⁻, 9.2.

Example VII.—Preparation of 2-(2,6-dichlorophenyl)-4-hydroxy-5-sec.butoxycarbonylmethylthiazole hydrochloride Dry HCl gas was passed through a stirred mixture of 700 g. of 2-(2,6-dichlorophenyl)-4-hydroxy-5-carboxymethylthiazole and 2.5 liters of sec.butanol for 2.5 hours. The solid product which crystallized on cooling was filtered off. Yield 500 g., melting point 174–176° C.

*Analysis.*—Calculated for $C_{15}H_{16}Cl_3NO_3S$ percent: C, 45.4; H, 4.0; N, 3.5; S, 8.1; Cl, 26.9; Cl⁻, 9.0. Found: C, 45.4; H, 3.8; N, 3.5; S, 8.2; Cl, 26.6; Cl⁻, 8.6.

Example VIII.—Preparation of 2-(2,6-dichlorophenyl)-4-hydroxy-5-sec.butoxycarbonylmethylthiazole 5 grams of 2-(2,6-dichlorophenyl)-4-hydroxy-5-sec.butoxycarbonylmethylthiazole hydrochloride were stirred for 2 hours with an aqueous solution of sodium acetate. The product formed was filtered off and recrystallized from benzene. Yield 3 g., melting point 182–183° C.

*Analysis.*—Calculated for $C_{15}H_{15}Cl_2NO_3S$ percent: C, 50.0; H, 4.2; N, 3.9; S, 8.9; Cl, 19.7. Found: C, 50.0; H, 4.3; N, 3.7; S, 9.0; Cl, 19.9.

Example IX.—Preparation of 2-(2,6-dichlorophenyl)-4-hydroxy-5-(1-methylheptoxycarbonylmethyl)thiazole hydrochloride Dry HCl gas was passed through a stirred mixture of 700 g. of 2-(2,6-dichlorophenyl)-4-hydroxy-5-carboxymethylthiazole and 2.5 liters of octan-2-ol for 3 hours. The mixture was then warmed until all solids had dissolved. The product which crystallized out on cooling of the solution was filtered off. Yield 520 g., melting point 127–131° C.

*Analysis.*—Calculated for $C_{19}H_{24}Cl_3NO_3S$ percent: C, 50.4; H, 5.3; N, 3.1; S, 7.1; Cl, 23.5; Cl⁻, 7.8. Found: C, 50.8; H, 5.5; N, 3.0; S, 7.5; Cl, 23.4; Cl⁻, 7.4.

Example X.—Preparation of 2-(2,6-dichlorophenyl)-4-hydroxy-5-(1-methylheptoxycarbonylmethyl)thiazole 500 grams of 2-(2,6-dichlorophenyl-4-hydroxy-5-(1-methylheptoxycarbonylmethyl)thiazole hydrochloride was stirred for 24 hours with an aqueous sodium acetate solution. The solid product was filtered off and dissolved in ether. The ethereal solution was dried and evaporated to dryness. Yield 430 g., melting point 110–111° C.

*Analysis.*—Calculated for $C_{19}H_{23}Cl_2NO_3S$ percent: C, 54.8; H, 5.5; N, 3.3; S, 7.7; Cl, 17.1. Found: C, 54.9; H, 5.6; N, 3.2; S, 8.1; Cl, 16.9.

Example XI.—Preparation of 2-(2,6-dichlorophenyl)-4-hydroxy-5-(3,5,5-trimethylhexoxycarbonylmethyl)thiazole hydrochloride A mixture of 700 g. of 2-(2,6-dichlorophenyl)-4-hydroxy-5-carboxymethylthiazole and 2.5 liters of 3,5,5-trimethylhexanol were stirred at a temperature of 70–80° C. for 3 hours with passage of dry HCl gas through the mixture. One liter of ether was added to the cooled reaction mixture, the solid product was filtered off, and recrystallized from acetone. Yield 240 g., melting point 124–126° C.

*Analysis.*—Calculated for $C_{20}H_{26}Cl_3NO_3S$ percent: C, 51.4; H, 5.6; N, 3.0; S, 6.9; Cl, 22.8. Found: C, 51.9; H, 5.7; N, 3.0; S, 7.3; Cl, 21.4.

Example XII.—Preparation of 2-(2,6-dichlorophenyl)-4-hydroxy-5-(3,5,5-trimethylhexoxycarbonylmethyl)thiazole 350 grams of 2-(2,6-dichlorophenyl)-4-hydroxy-5-(3,5,5-trimethylhexoxycarbonylmethyl)thiazole hydrochloride were stirred for 24 hours with an aqueous sodium acetate solution. The solid product was filtered off; yield 320 g. Melting point after recrystallization from ether 125–126° C.

*Analysis.*—Calculated for $C_{20}H_{25}Cl_2NO_3S$ percent: C, 55.8; H, 5.8; S, 7.4; Cl, 16.5. Found: C, 56.1; H, 6.0; S, 7.6; Cl, 16.5.

Example XIII

This example illustrates the preparation of wettable powders, emulsifiable concentrates, and granular formulations containing a compound of the present invention as active ingredient.

(a) A wettable powder consisting of 50.5% by weight of 2 - (2,6-dichlorophenyl)-4-hydroxy-5-carboxymethylthiazole, 3.0% by weight of a sodium polyacrylate (Tamol 731) as suspending agent, 2.0% by weight of sodium lauryl sulfate (Empicol LZ) as wetting agent, and 44.5% by weight of a kaolinite clay (Clay GTY) was prepared by blending, hammer milling and air milling the said ingredients.

(b) A wettable powder consisting of the same ingredients as mentioned under (a) but containing 50.5% by weight of 2 - (2,6 - dichlorophenyl)-4-hydroxy-5-ethoxycarbonylmethylthiazole instead of 2-(2,6-dichlorophenyl)-4-hydroxy-5-carboxymethylthiazole was prepared by blending, hammer milling and air milling the ingredients.

The wettable powders described under (a) and (b) possess good suspension properties. No decomposition occurred when the compositions were kept at 55° C. during 5 days.

(c) An emulsifiable concentrate was prepared by mixing 20.2 g. of 2-(2,6-dichlorophenyl)-4-hydroxy-5-carboxymethylthiazole, 5.0 g. of a condensation product of octylphenol with ethylene oxide having an average of 8.5 ethylene oxide units per molecule, (Nonidet P 40), and 5.0 g. of a condensation product of octylphenol with ethylene oxide having an average of 11 ethylene oxide units per molecule (Nonidet P 80) as emulsifying agents, 30 g. of a dimethyl alkylamine derived from soya oil (Armeen DMSD) as solubilizing agent, and mixed petroleum xylenes to a total volume of 100 ml.

The emulsifiable concentrate turned out to be stable when kept at 55° C. for 5 days. When kept at 0° C. no crystallization of the active material took place.

(d) A granular formulation was prepared consisting of 10.1% by weight of 2-(2,6-dichlorophenyl)-4-hydroxy-5-carboxymethylthiazole, 1.0% by weight of polyvinyl alcohol (Rhodoviol HS 100) as binding agent, and 88.9% by weight of a kaolinite clay (Speswhite).

Example XIV

To estimate the herbicidal activity compounds of the invention were tested using a representative range of plants: oat (O), ryegrass (RG), sweet corn (SC), pea (P), sugar beet (SB), linseed (L) and mustard (M).

Two categories of tests, pre-emergence and post-emergence tests were carried out. The pre-emergence test involved spraying of the soil in which seeds of the plant species mentioned above had recently been sown, with a liquid formulation of a compound of the invention. The post-emergence tests involved two types of tests vis. soil drench and foliar spray tests. In the soil drench tests the soil was drenched with a liquid formulation containing a compound of the invention after the seeds of the plant species mentioned above had been germinated; in the foliar spray tests seedling plants were sprayed with such a formulation.

The formulations used in the above tests consisted of 40 parts by volume of acetone, 60 parts by volume of water, 0.5 part by weight of an alkylphenol/ethylene oxide condensate available under the trade name Triton X–155, and a compound of the invention in varying amounts.

The seeds of the plant species mentioned above were sown and allowed to germinate in sterile John Innes compost.

In the soil spray and soil drench tests, the sown soil and the soil bearing the seedling plants, were sprayed at a volume equivalent to 50 gallons per acre and drenches at a volume equivalent to 1000 gallons per acre respectively. In the foliar spray tests, seedling plants were sprayed with a volume equivalent to 50 gallons per acre. Control tests were also carried out in which sown soil, seedling

TABLE I

Structure: R = substituent on

Cl-phenyl-O-C(=N-C-OH)-S-C-CH₂COOR with Cl substituents

| R= | GI Level, percent | Pre-emergence (seeds) Soil Spray | | | | | | Post-emergence (plants) Foliar Spray | | | | | | Post-emergence (plants) Soil Drench | | | | | |
|---|---|---|---|---|---|---|---|---|---|---|---|---|---|---|---|---|---|---|---|
| | | SC | O | RG | P | L | M | SB | SC | O | RG | P | L | M | SB | SC | O | RG | P | L | M | SB |
| H | 50 | <1.0 | <1.0 | <1.0 | <1.0 | <1.0 | <1.0 | <1.0 | 5.8 | <1.0 | 1.1 | X | 8.3 | 4.6 | 2.2 | 2.2 | <1.0 | <1.0 | 6.4 | 4.3 | 5.8 | 5.7 |
| | 90 | <1.0 | <1.0 | <1.0 | <1.0 | <1.0 | <1.0 | <1.0 | 4.4 | 1.4 | X | X | X | X | X | Z | 17.0 | Z | 20.0 | Z | Z | Z |
| CH₃ | 50 | 0.8 | 0.1 | 0.2 | 0.3 | 0.6 | 0.8 | 0.2 | 9.0 | 7.1 | <1.0 | X | X | X | 12.5 | Z | <1.0 | 1.7 | Z | Z | 20.0 | 12.7 |
| | 90 | 3.8 | 0.2 | 0.5 | 0.8 | 1.0 | 1.1 | 0.3 | X | X | 7.9 | X | X | X | X | Z | Z | 2.0 | Z | Z | Z | Z |
| C₂H₅ | 50 | 1.2 | 0.1 | 0.3 | 0.5 | 0.2 | 0.5 | 0.2 | X | X | X | X | X | X | X | 13.5 | 9.5 | 1.5 | Z | Z | Z | Z |
| | 90 | 2.2 | 0.2 | 0.3 | 0.5 | 0.5 | 1.0 | 0.3 | X | X | X | X | X | X | X | Z | Z | Z | Z | Z | Z | 7.5 |
| —CH(CH₃)₂ | 50 | 6.4 | 0.3 | 0.3 | 6.0 | 1.6 | 1.6 | 0.3 | X | X | X | X | X | X | X | 3.6 | 1.8 | Z | Z | Z | 11.9 | Z |
| | 90 | X | 0.3 | 0.3 | X | 4.7 | 7.7 | 0.3 | X | X | X | X | X | X | X | Z | Z | Z | Z | Z | Z | Z |
| —CHCH₂CH₃ / CH₃ | 50 | 3.0 | 0.3 | 0.3 | 4.6 | 1.7 | 1.7 | 0.3 | X | X | X | X | X | X | X | Z | 11.2 | 3.5 | Z | Z | Z | Z |
| | 90 | 7.9 | 0.4 | 0.6 | 7.3 | 4.0 | 4.0 | 0.3 | X | X | X | X | X | X | X | Z | Z | Z | T | Z | Z | Z |
| —CH(CH₂)₅CH₃ | 50 | 5.6 | 0.4 | <0.4 | 1.8 | <0.4 | 1.8 | 0.4 | X | X | X | X | X | X | X | 6.4 | 1.9 | 4.1 | Z | Z | Z | Z |
| | 90 | X | 0.4 | 0.5 | X | 1.1 | 4.2 | 0.4 | X | X | X | X | X | X | X | Z | 3.4 | Z | Z | Z | Z | Z |
| —CH₂CH₂CHCH₂C(CH₃)₃ / CH₃ | 50 | X | 0.7 | 2.1 | X | 2.3 | 9.0 | 1.9 | X | X | X | X | X | X | X | Z | 2.5 | 1.4 | 7.7 | Z | Z | Z |
| | 90 | X | 1.8 | 6.8 | X | 6.5 | X | 4.5 | X | X | X | X | X | X | X | Z | 5.9 | Z | Z | Z | Z | Z |

TABLE II

Structure: Cl-phenyl-O-C(=N-C-OH·HCl)-S-C-CH₂COOR

| R= | GI level, percent | Pre-emergence (seeds) Soil Spray | | | | | | Post-emergence (plants) Foliar Spray | | | | | | Post-emergence (plants) Soil Drench | | | | | |
|---|---|---|---|---|---|---|---|---|---|---|---|---|---|---|---|---|---|---|---|
| | | SC | O | RG | P | L | M | SB | SC | O | RG | P | L | M | SB | SC | O | RG | P | L | M | SB |
| CH₃ | 50 | 1.6 | <0.3 | 0.3 | 1.8 | 0.3 | 2.4 | <0.3 | 2.8 | X | X | X | X | X | X | 8.3 | 1.9 | 3.0 | Z | Z | 8.4 | 8.3 |
| | 90 | 3.0 | 0.3 | 0.6 | 4.0 | 0.4 | 2.6 | 0.3 | X | X | X | X | X | X | X | Z | Z | Z | Z | Z | Z | Z |
| —CH(CH₃)₂ | 50 | 1.8 | 0.3 | 0.3 | 1.9 | 0.3 | 1.4 | <0.3 | 8.1 | 5.6 | X | X | X | X | X | 8.2 | 1.7 | 1.6 | Z | Z | Z | Z |
| | 90 | 4.5 | 0.3 | 0.4 | 2.8 | 0.7 | 3.8 | <0.3 | X | X | X | X | X | X | X | Z | Z | Z | Z | Z | Z | Z |
| —CHCH₂CH₃ / CH₃ | 50 | 6.0 | <0.3 | 0.3 | 5.0 | <0.3 | 5.3 | <0.3 | X | X | X | X | X | X | X | 10.5 | <1 | 1.9 | Z | Z | 13.8 | 4.2 |
| | 90 | X | 0.3 | 0.4 | X | 1.3 | X | 0.3 | X | X | X | X | D | X | X | Z | Z | Z | Z | Z | Z | Z |
| —CH(CH₂)₆CH₃ / CH₃ | 50 | 7.8 | <0.4 | 1.0 | 8.4 | 1.7 | 4.8 | 0.5 | X | X | X | X | X | X | X | Z | 8.4 | 3.2 | Z | Z | Z | Z |
| | 90 | X | 0.7 | 1.6 | X | 4.2 | X | 1.8 | X | X | X | X | X | X | X | Z | Z | Z | Z | Z | Z | Z |
| —CH₂CH₂CHCH₂C(CH₃)₃ | 50 | X | <0.4 | 1.8 | X | 3.4 | X | 1.7 | X | X | X | X | X | X | X | Z | 1.4 | 4.5 | 14.2 | Z | Z | Z |
| | 90 | X | 1.8 | 2.4 | X | 4.8 | X | 2.3 | X | X | X | X | X | X | X | Z | 11.8 | Z | Z | Z | Z | Z | plants bearing soil, and plants were treated with the same compositions but containing no active compound.

The phytotoxic effect of the compounds applied was assessed by determining the reduction in fresh weight of stem and leaf of the treated plants over the control plant and plotting a regression curve relating to growth inhibition (G.I.) and the dosage of compound applied. The dosage required for 50% and 90% growth inhibition (i.e. that weight of compound required to give a reduction in the fresh weight of plant leaf and stem of 50 or 90%) is given in the following Tables I and II. The dosages are in the form of pounds per acre; X and Z represent dosages of greater than 10 and 20 pounds per acre respectively.

We claim as our invention:

1. A compound of the formula:

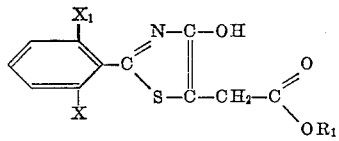

wherein $R_1$ represents hydrogen or alkyl of 1 to 10 carbon atoms, X represents a halogen atom, and salts of such a compound.

2. A compound according to claim 1 wherein each X is chlorine and the hydrochloride salts of such a compound.

3. A compound according to claim 2 wherein $R_1$ is hydrogen.

4. A compound according to claim 2 wherein $R_1$ is methyl.

5. A compound according to claim 2 wherein $R_1$ is isopropyl.

6. A compound according to claim 2 wherein $R_1$ is secondary butyl.

7. The hydrochloride salt of the compound according to claim 4.

References Cited

Holmberg, Chem. Abstracts, vol. 44, p. 4423f (1950).

ALTON D. ROLLINS, *Primary Examiner.*

U.S. Cl. X.R.

260—306.7; 71—90

UNITED STATES PATENT OFFICE
CERTIFICATE OF CORRECTION

Patent No. 3,418,331  
December 24, 1968

John Yates et al.

It is certified that error appears in the above identified patent and that said Letters Patent are hereby corrected as shown below:

In the heading to the printed specification, between lines 7 and 8, insert -- Claims priority, application Great Britain, Jan. 28, 1965, 3,786/65 --.

Signed and sealed this 24th day of March 1970.

(SEAL)  
Attest:

Edward M. Fletcher, Jr.  
Attesting Officer

WILLIAM E. SCHUYLER, JR.  
Commissioner of Patents